Patented Mar. 18, 1952

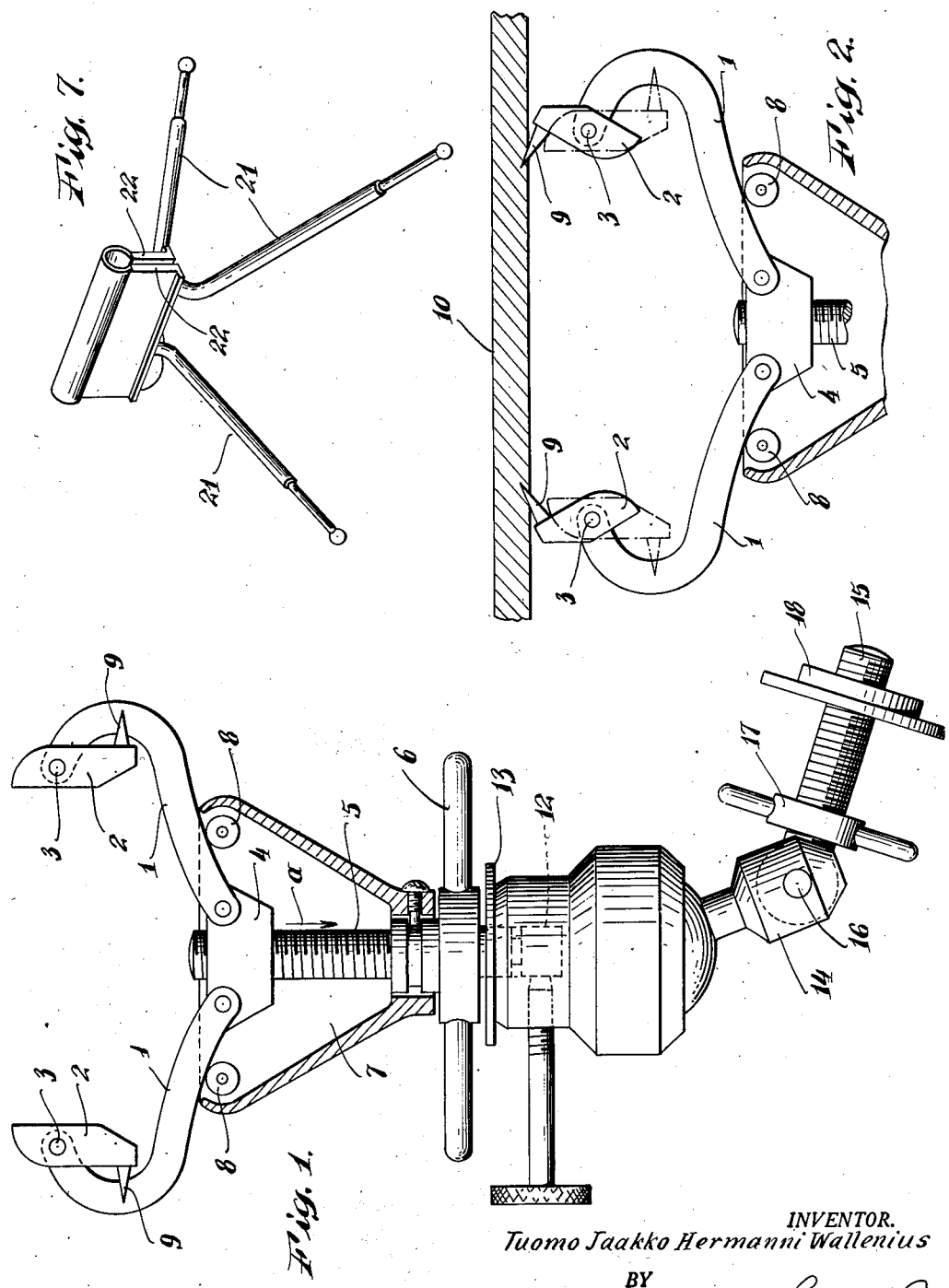

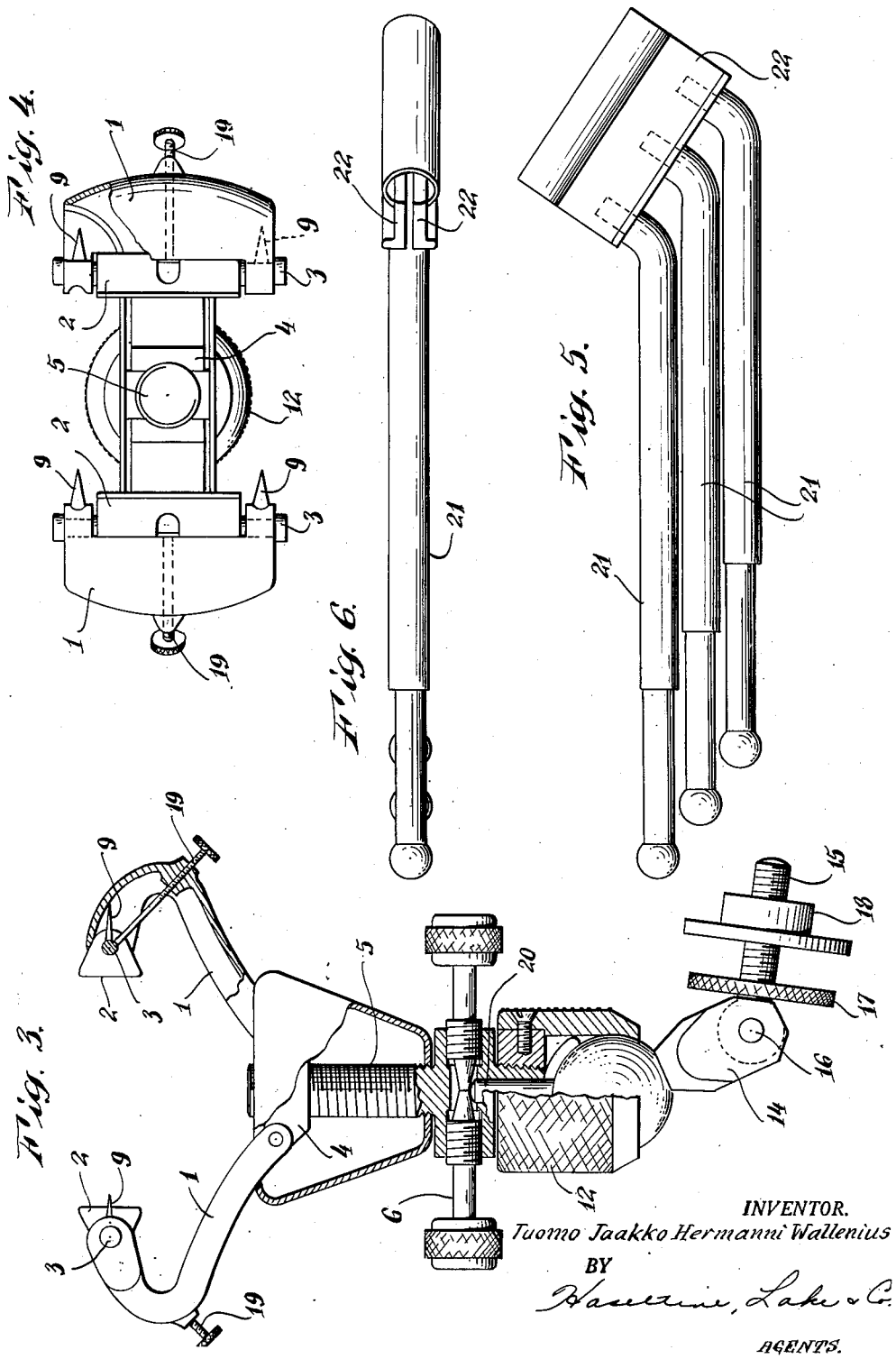

2,589,520

UNITED STATES PATENT OFFICE 2,589,520

FIXTURE FOR CAMERAS OR OTHER SIMILAR APPARATUS

Tuomo Jaakko Hermanni Wallenius,
Tampere, Finland

Application February 28, 1948, Serial No. 11,956
In Finland May 27, 1947

1 Claim. (Cl. 248—177)

The present invention relates to a stand or supporting fixture and more particularly to a portable supporting stand or fixture for cameras or the like and having gripping jaws which may readily be attached to or detached from a supporting surface.

It is the principal object of this invention to provide a supporting fixture having clamping members for gripping a supporting member and characterized by clamping jaws convertible to provide two different forms of gripping surfaces, one form having a pointed surface for engagement with plane wall surface or irregularly surfaced supporting member and the other form having a relatively smooth gripping surface for engagement with both sides of a supporting member such as a fence rail or the like.

A supporting stand structure or fixture according to this invention and having clamping members as described above may be provided with a suitable universal joint and thus may be adapted to support a camera in place of the usual bulky and cumbersome tripod support, provided only that suitable supporting surfaces are available for the gripping elements of the clamping members.

Yet another object of this invention is to provide a removable supporting fixture structure which may be readily attached to or detached from most any of the available supporting surfaces whether they be vertical wall surfaces, posts, horizontal fence rails or the like.

Further objects and advantages of this invention will be apparent with reference to the following specification and drawings in which:

Figure 1 is a view, partly in section, of one form of the supporting fixture of this invention;

Figure 2 is a fragmentary view to show the manner of attaching the pointed form of gripping elements to a plane supporting surface such as a wall;

Figure 3 is a view of another form of the invention similar to that shown in Figure 1;

Figure 4 is a top end view of Figure 3;

Figure 5 is a side elevation of a suitable supporting surface structure having tripod legs for use as an accessory to the supporting fixture of this invention;

Figure 6 is a top plan view of Figure 5; and

Figure 7 is a perspective view of the structure of Figure 5 with the legs extended in tripod fashion.

Referring to Figs. 1 and 2 of the drawings, the respective clamping arms 1 are provided with clamp plates or gripping surfaces 2, which turn on pivots 3. The arms 1 are pivoted to a collar 4, the inside of which is threaded for cooperation with the outer thread of screw 5. In turning screw 5 clockwise by means of the hand lever 6, the collar 4 is moved inward of the body member or bell housing 7 as shown by arrow $a$. Rollers 8, mounted to rotate in body member 7, cooperate with the arms 1 to move the arms toward each other as the collar 4 is moved inward. The clamping plates 2 are therefore caused to grip a supporting surface between them, for instance, the surface of a table or the like, thus securing the fixture firmly to its supporting surface.

As illustrated in Figure 1, the smooth, pointless gripping surfaces of clamps 2 are facing each other, and they are used when the device is to be fixed to objects, of which the surface must be spared from damage. In using the device outdoors, where it may be fixed to wooden fences or to the root or a branch of a tree, the pointed gripping surfaces of the clamp plates 2 may be turned to face each other, which enables a more firm grip between the clamp plates and the supporting surface. It will be noted that the clamp plates 2 are turnable on pivots 3 and, therefore, there is no necessity for the supporting surfaces to be in the same line.

Figure 2 illustrates a special way of affixing the stand of this invention to a plane wall surface. The clamp plates 2 are turned to the position shown in Fig. 2 with an end surface of the plate resting against arm 1 to limit the outward turning of the plate. By pressing the device slightly against the wall surface 10 and by turning screw 5 to move the collar 4 inward, the clamp points 9 are driven into the wall surface 10. In this way it is possible to fix the device to a smooth wooden wall. The clamp plates 2 may be limited in their movement about their pivots 3 by an angular amount up to 270° so as to enable the points 9 to enter a plane wall surface.

The remote end of screw 5 is further provided with a threaded stud end 12 and has a lock-nut 13, by which an object to be supported can be secured to the supporting fixture. The threads on stud 12 may be the same standard threads as are used for cameras, and a camera can thus be fixed directly to the end 12. However, it may be more desirable to affix a ball-and-socket joint in a most convenient way to the stud 12, the supporting end of which may further have a cross-head joint 14. To this cross-head screw 15 is pivotally fastened by means of pin 16. By turning the lock-nut 17 the screw 15 can, with regard to its relative position to the cross-head, be locked into a desired position.

A camera or another apparatus or device may be secured to screw 15 and locked thereon by means of the lock-nut 18 on said screw.

The modified form of the invention illustrated in Figs. 3 and 4 is similar to that of Figs. 1 and 2, but the clamp points 9 are fixed to the pivotal axle 3 and the clamp plate 2 is freely rotatable on this axle. The ends of pivot axle 3 may extend so that the axle can be manually rotated by the fingers, and clamp points 9 can thus be moved out or in. A clamping screw 19 may be provided to secure axle 3 and the points in their desired adjusted positions.

Also, as more clearly shown in Fig. 3, the handle 6 may cooperate directly with a ball-joint universal. The handle 6 has, as seen from Fig. 3, an inverted conical center portion about which the end of the plug 20 is journalled. By turning the rod in either direction, it being threaded as shown, the plug 20 will be pressed against the ball-joint to lock it in its desired position.

Figs. 5, 6 and 7 illustrate an extra accessory unit providing a supporting surface having three extensible legs 21. One end of each of these legs 21 is placed between two pivotally joined clamping plates 22. The legs 21 can then be turned to a position shown in Figs. 5 and 6, in which they demand very little space, for instance only a small case for carrying the accessory unit with the supporting stand or fixture of the invention. As shown in Fig. 7, the legs 21 can be turned into their supporting position. The plates 22 may be positioned between the clamp plates 2 of the fixture shown in Figures 1, 2 or 3, 4. When the clamp arms 1 are now moved together, the ends of legs 21 will be gripped between the supporting surface plates 22 and thus fastened in place.

The invention has been described hereabove only as an example of construction, and several alternations can be made to the same without departing from the actual idea of the invention.

Having thus described my invention, what I claim as new, and desire to secure by Letters Patent is:

A supporting fixture having a pair of relatively movable gripping jaws for attachment to a supporting surface, each of said jaws being rotatably journalled on a respective axle rotatably carried on the end of a respective clamp arm, means to move the clamp arms relative to each other, and a gripping point fastened to each of said axles and adapted to be moved into a position for engagement with a supporting surface by rotation of the respective axle, and means to rotate said axle.

TUOMO JAAKKO HERMANNI WALLENIUS.

REFERENCES CITED

The following references are of record in the file of this patent:

UNITED STATES PATENTS

| Number | Name | Date |
|---|---|---|
| 575,779 | Homan | Jan. 26, 1897 |
| 1,343,641 | Patterson | June 15, 1920 |
| 1,412,961 | Periolat | Apr. 18, 1922 |
| 2,287,485 | Pierce | June 23, 1942 |

FOREIGN PATENTS

| Number | Country | Date |
|---|---|---|
| 330,251 | France | June 1903 |